(12) United States Patent
Heins et al.

(10) Patent No.: US 11,535,309 B2
(45) Date of Patent: Dec. 27, 2022

(54) HINGE ASSEMBLY FOR A POWER TAILGATE SYSTEM

(71) Applicant: Aisin Technical Center of America, Inc., Northville, MI (US)

(72) Inventors: Ryan Heins, Wixom, MI (US); Nicholas Ozog, South Lyon, MI (US); Takashi Nishio, Novi, MI (US); Yoji Nagashima, Novi, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 211 days.

(21) Appl. No.: 16/883,246

(22) Filed: May 26, 2020

(65) Prior Publication Data

US 2021/0371017 A1 Dec. 2, 2021

(51) Int. Cl.
*B62D 33/027* (2006.01)

(52) U.S. Cl.
CPC ................................ *B62D 33/0273* (2013.01)

(58) Field of Classification Search
CPC ...... B62D 33/0273; B62D 33/03; B60J 5/108; E05F 15/611; E05F 15/622; E05Y 2900/544; E05Y 2900/546
See application file for complete search history.

(56) References Cited

U.S. PATENT DOCUMENTS

| | | | |
|---|---|---|---|
| 3,145,988 A * | 8/1964 | Colautti | B60J 5/103 267/74 |
| 6,217,097 B1 * | 4/2001 | Rogers, Jr. | E05F 15/63 49/342 |
| 7,287,803 B2 * | 10/2007 | Koneval | B62D 33/0273 296/57.1 |
| 2004/0108743 A1 | 6/2004 | Gruber | |
| 2006/0202500 A1 * | 9/2006 | Eschebach | B62D 33/0273 296/57.1 |
| 2006/0214454 A1 * | 9/2006 | Austin | E05F 1/1238 296/57.1 |
| 2007/0132264 A1 | 6/2007 | Koneval et al. | |
| 2008/0054669 A1 | 3/2008 | Eschebach et al. | |
| 2008/0100085 A1 | 5/2008 | Ohly | |

(Continued)

FOREIGN PATENT DOCUMENTS

WO 2019178196 A1 9/2019

*Primary Examiner* — Gregory A Blankenship
(74) *Attorney, Agent, or Firm* — Christopher G. Darrow; Darrow Mustafa PC

(57) ABSTRACT

A hinge assembly includes a tailgate bracket securable to a vehicular tailgate, a support bracket securable to a vehicular bed, a torque shaft, and a crank. The tailgate bracket includes a socket. The support bracket includes a support. The torque shaft is supported by the support for axial rotation. The torque shaft includes a tailgate-side head and a crank-side head. The tailgate-side head and the socket are configured to make a head-and-socket connection with one another. The crank-side head includes an external profile. The crank includes a shaft-side base and an actuator-side base, a load arm extending therebetween, and at least one of a dogleg along the shaft-side base, the load arm and the actuator-side base, and an embossed rib extending along the load arm. The shaft-side base includes an internal profile. The external profile and the internal profile are configured to make a shaft-and-hub connection with one another.

20 Claims, 3 Drawing Sheets

(56) References Cited

U.S. PATENT DOCUMENTS

| | | | |
|---|---|---|---|
| 2008/0224494 A1* | 9/2008 | Anderson | F16F 1/10 |
| | | | 296/57.1 |
| 2008/0277960 A1 | 11/2008 | Zagoroff | |
| 2009/0184533 A1* | 7/2009 | Townson | E05F 1/1292 |
| | | | 296/57.1 |
| 2009/0302630 A1* | 12/2009 | Duffy | E05F 1/123 |
| | | | 296/57.1 |
| 2013/0278004 A1* | 10/2013 | Sackett | B62D 33/0273 |
| | | | 296/57.1 |
| 2014/0324251 A1 | 10/2014 | Hansen | |
| 2015/0315837 A1 | 11/2015 | Salmon et al. | |
| 2015/0361710 A1 | 12/2015 | Hansen | |
| 2016/0160553 A1* | 6/2016 | Nania | E05F 15/627 |
| | | | 296/50 |
| 2017/0089113 A1 | 3/2017 | Katsuyama et al. | |
| 2017/0089116 A1 | 3/2017 | Heiberger et al. | |
| 2018/0056927 A1* | 3/2018 | Yamada | E05D 3/125 |
| 2018/0229779 A1* | 8/2018 | Jergess | E05F 15/614 |
| 2018/0266161 A1 | 9/2018 | Jergess et al. | |
| 2019/0264488 A1 | 8/2019 | Hattori et al. | |
| 2019/0301231 A1 | 10/2019 | Gabbianelli et al. | |
| 2020/0047821 A1* | 2/2020 | Santana | E05F 15/614 |
| 2020/0399943 A1* | 12/2020 | Ulewicz | B62D 33/0273 |
| 2021/0131160 A1* | 5/2021 | Kobayashi | E05F 1/002 |
| 2021/0155297 A1* | 5/2021 | Lakerdas | E05F 1/1008 |
| 2021/0245689 A1* | 8/2021 | Williams | B60S 1/66 |
| 2022/0089227 A1* | 3/2022 | Sridhar | B62D 33/0273 |

* cited by examiner

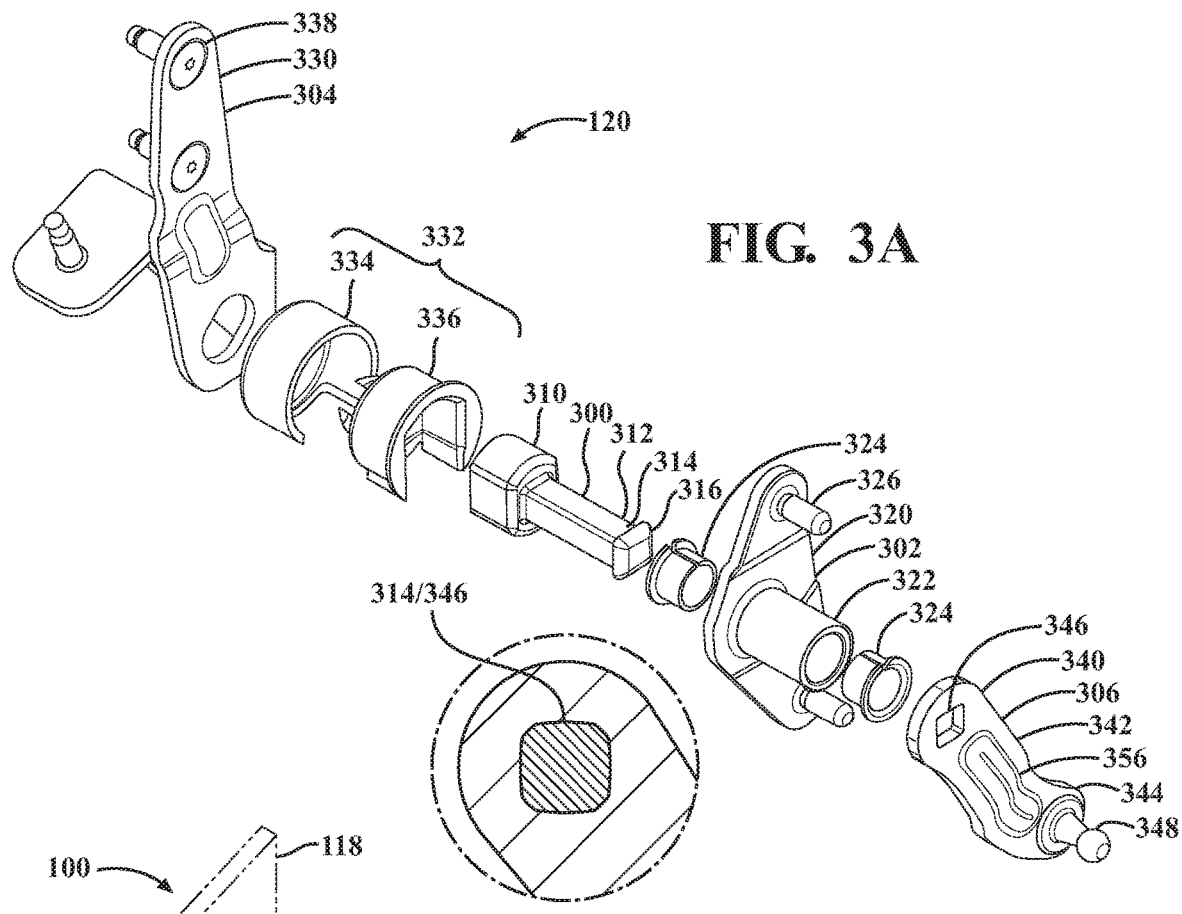
FIG. 3A
FIG. 3D
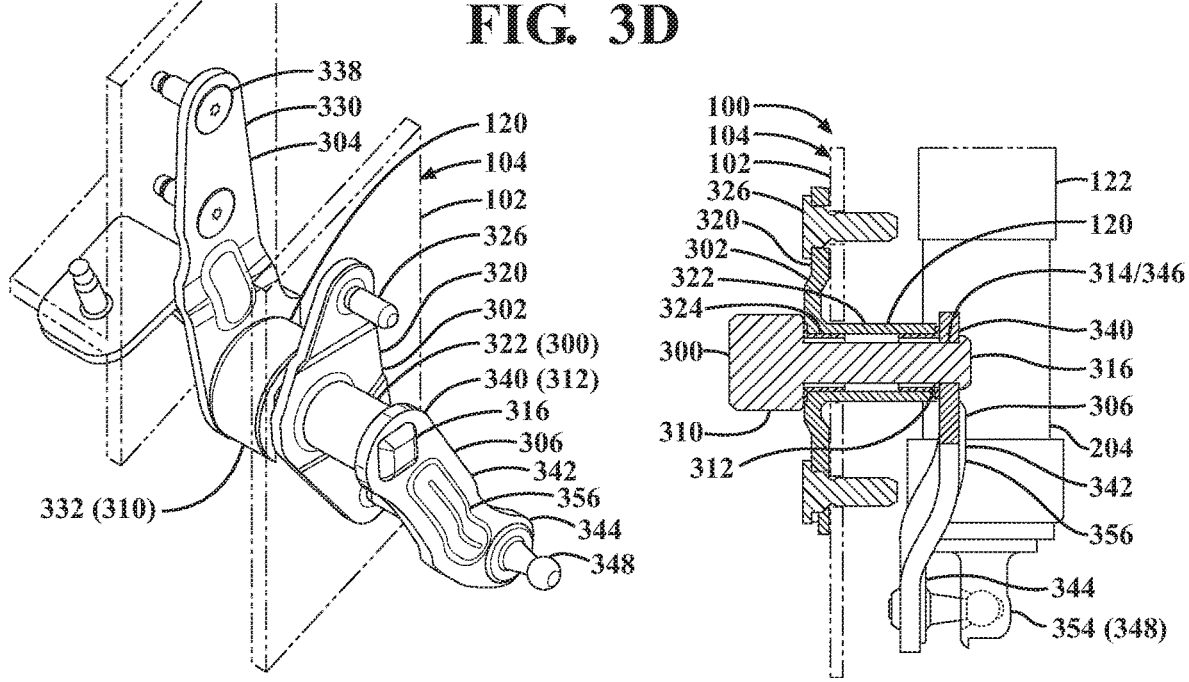
FIG. 3B
FIG. 3C

HINGE ASSEMBLY FOR A POWER TAILGATE SYSTEM

TECHNICAL FIELD

The embodiments disclosed herein relate to vehicles with tailgates and, more particularly, to power tailgate systems for pivotally closing the tailgates and pivotally opening the tailgates.

BACKGROUND

Many vehicles include tailgates. The tailgates serve as closure panels, and are pivotally movable between open positions and closed positions. Many of today's vehicles with tailgates also include power tailgate systems. Among other things, the power tailgate systems include hinge assemblies for supporting the tailgates for pivotal movement between the open positions and the closed positions. Moreover, the power tailgate systems include tailgate actuators that, through the hinge assemblies, pivotally close the tailgates, pivotally open the tailgates, and otherwise pivotally move the tailgates between the open positions and the closed positions.

SUMMARY

Disclosed herein are embodiments of a hinge assembly for a power tailgate system, and a vehicle with components of the hinge assembly. In one aspect, a vehicle includes a bed, a tailgate, a tailgate bracket secured to the tailgate, a support bracket secured to the bed, a torque shaft extending through the bed, a crank housed in the bed, and a tailgate actuator housed in the bed. The tailgate bracket includes a socket projecting outside the tailgate. The support bracket includes a support extending through the bed. The torque shaft extends through the bed together with the support, and is supported thereby for axial rotation. The torque shaft includes a tailgate-side head projecting outside the bed, and a crank-side head projecting inside the bed. The tailgate-side head and the socket are configured to make a head-and-socket connection with one another. The crank-side head includes an external profile. The crank includes a shaft-side base and an actuator-side base, a load arm extending therebetween, and at least one of a dogleg along the shaft-side base, the load arm and the actuator-side base, and an embossed rib extending along the load arm. The shaft-side base includes an internal profile. The external profile and the internal profile are configured to make a shaft-and-hub connection with one another. The actuator-side base includes a ball stud projecting therefrom. The tailgate actuator is operable to pivot the crank against the bed to pivotally move the tailgate. The tailgate actuator includes a ball socket. The ball stud and the ball socket are configured to make a ball-and-socket connection with one another.

In another aspect, a hinge assembly includes a tailgate bracket securable to a vehicular tailgate, a support bracket securable to a vehicular bed, a torque shaft, and a crank. The tailgate bracket includes a socket. The support bracket includes a support. The torque shaft is supported by the support for axial rotation. The torque shaft includes a tailgate-side head and a crank-side head. The tailgate-side head and the socket are configured to make a head-and-socket connection with one another. The crank-side head includes an external profile. The crank includes a shaft-side base and an actuator-side base, a load arm extending therebetween, and at least one of a dogleg along the shaft-side base, the load arm and the actuator-side base, and an embossed rib extending along the load arm. The shaft-side base includes an internal profile. The external profile and the internal profile are configured to make a shaft-and-hub connection with one another.

In yet another aspect, a hinge assembly includes a tailgate bracket securable to a vehicular tailgate, a support bracket securable to a vehicular bed, a torque shaft, and a crank. The tailgate bracket includes an open-bottomed socket. The support bracket includes a support. The torque shaft is supported by the support for axial rotation. The torque shaft includes a tailgate-side head and a crank-side head. The tailgate-side head and the socket are configured to make a head-and-socket connection with one another, with the socket being configured to receive and release the tailgate-side head through the bottom to make and unmake the head-and-socket connection. The crank-side head includes an external four-lobe polygonal profile. The crank includes a shaft-side base and an actuator-side base, a load arm extending therebetween, and a dogleg along the shaft-side base, the load arm and the actuator-side base. The shaft-side base includes an internal four-lobe polygonal profile. The external four-lobe polygonal profile and the internal four-lobe polygonal profile are configured to make a shaft-and-hub connection with one another. The actuator-side base includes a ball stud projecting therefrom.

These and other aspects will be described in additional detail below.

BRIEF DESCRIPTION OF THE DRAWINGS

The various features, advantages and other uses of the present embodiments will become more apparent by referring to the following detailed description and drawing in which:

FIGS. 3A, 3B, 3C and 3D portray the vehicle using an assembly view, a partial perspective view, and partial side views, showing aspects of the hinge assembly.

DETAILED DESCRIPTION

This disclosure teaches a vehicle that includes a bed and a tailgate, as well as items serving as the basis for a power tailgate system, including a hinge assembly running between the bed and the tailgate, and a tailgate actuator housed in the bed. The hinge assembly connects the tailgate to the bed, and supports the tailgate from the bed for pivotal movement. Through the hinge assembly, the tailgate actuator is connected with the tailgate, and is operable to pivotally close the tailgate, pivotally open the tailgate, and otherwise pivotally move the tailgate between an open position and a closed position. The hinge assembly and the tailgate actuator include features and functionality for simplifying the construction of the vehicle, as well as improving reliability, quality, cost, manufacturability, design soundness, packaging and the like.

Figure 1A:
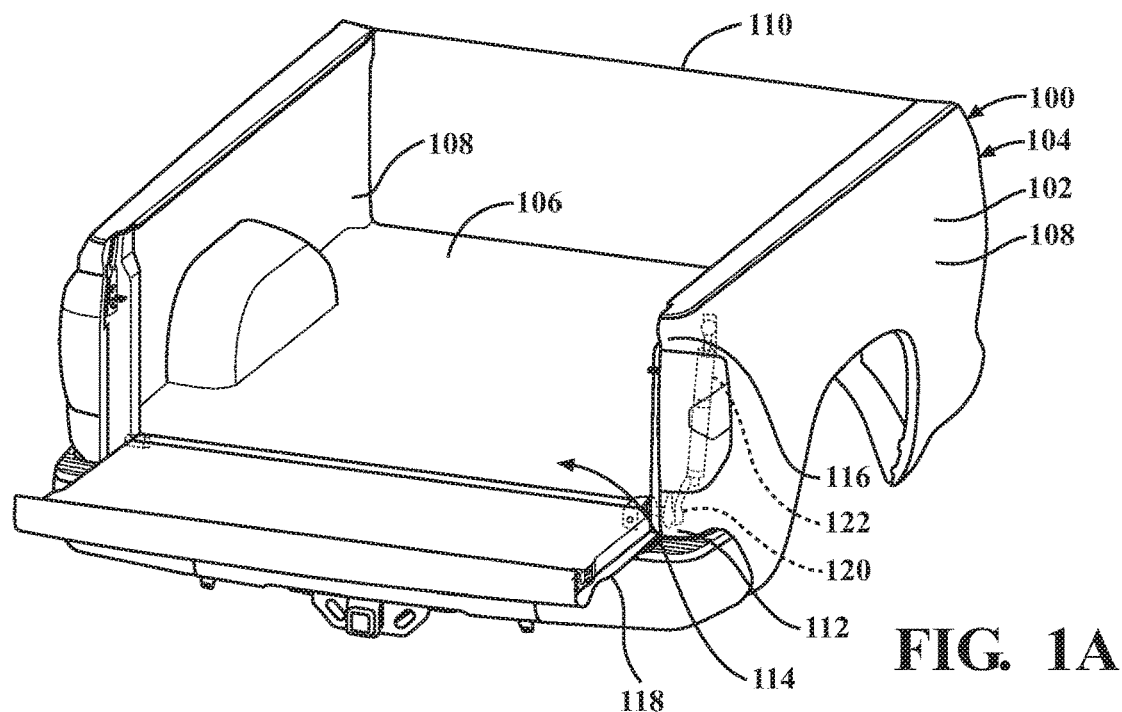
FIGS. 1A and 1B portray a vehicle using partial perspective views, showing a bed and a tailgate, as well as a hinge assembly and a tailgate actuator that serve as the basis for a power tailgate system.

Part of a representative passenger vehicle 100 is shown in FIG. 1A. As shown, the vehicle 100 is a pickup truck. The vehicle 100 includes an exterior and a number of interior compartments. In the illustrated pickup truck configuration of the vehicle 100, the compartments include an open-topped bed 102 for carrying cargo. In addition to the bed 102, the compartments may include a passenger compartment, an engine compartment and the like. Among other things, the vehicle 100 may include seats, a dash assembly, an instrument panel and the like housed in the passenger compartment. In addition, the vehicle 100 may include an engine, a motor, a transmission and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes a body 104 that forms the exterior and defines or otherwise encloses the bed 102 and the other compartments. In relation to the bed 102, the body 104 includes a deck 106, two sides 108, a bulkhead 110 and a rear end 112. At the rear end 112, the body 104 defines a tailgate opening 114. Likewise, the body 104, including but not limited to the sides 108, renders surrounding body 116 that frames the tailgate opening 114. The tailgate opening 114 opens between the bed 102 and the exterior. Relatedly, as part of the rear end 112, the body 104 includes a tailgate 118 corresponding to the tailgate opening 114.

Figure 1B:
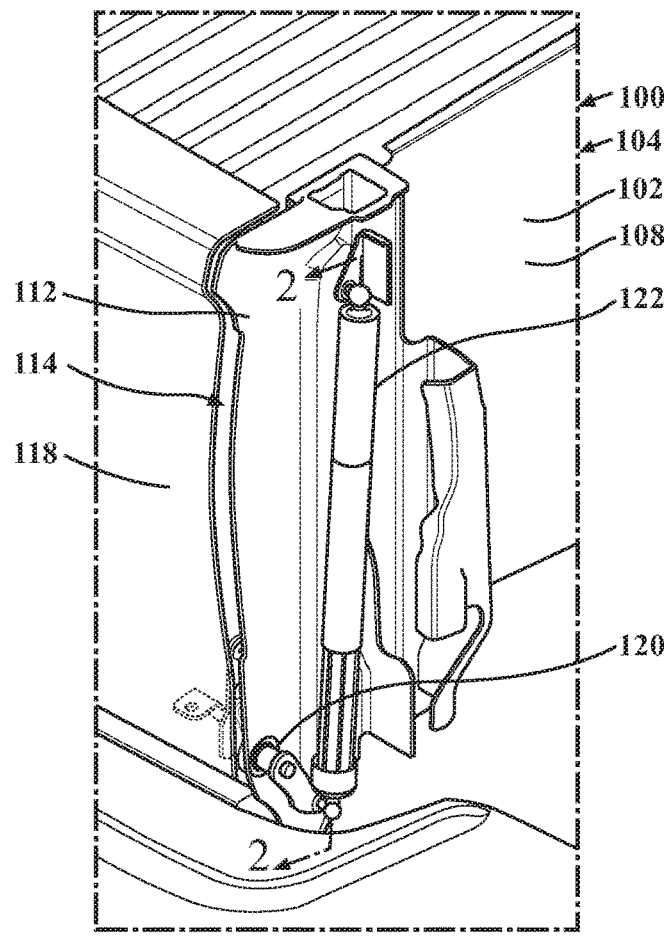

As shown with additional reference to FIG. 1B, the tailgate 118 serves as a closure panel for the bed 102. The tailgate 118 is connected to the bed 102 for pivotal movement, relative to the tailgate opening 114, between an open (or "down") position and a closed (or "up") position through a range of partially-open positions. In FIG. 1A, the tailgate 118 is shown in the open position. In the open position, the tailgate 118 is positioned away from the tailgate opening 114, which allows access to the bed 102 from the rear of the vehicle 100. In FIG. 1B, the tailgate 118 is shown in the closed position. In the closed position, the tailgate 118 is positioned over the tailgate opening 114, with the periphery of the tailgate 118 adjacent to the surrounding body 116, and the tailgate 118 in alignment with the surrounding body 116. In the partially-open positions, the tailgate 118 is between the closed position and the open position.

In relation to pivotally closing the tailgate 118 and pivotally opening the tailgate 118, the vehicle 100 includes a hinge assembly 120, and an in-bed tailgate actuator 122. The hinge assembly 120 runs between the bed 102 and the tailgate 118. The hinge assembly 120 connects the tailgate 118 to the bed 102, and supports the tailgate 118 from the bed 102 for pivotal movement between the open position and the closed position. The components of the hinge assembly 120 may, in large part, be made from one or more metallic materials, such as steel or aluminum, and may have any combination of fabricated, bent, stamped, extruded, casted and like constructions. The tailgate actuator 122 is housed in the bed 102. As shown, the tailgate actuator 122 is housed in the same compartment as a rear combination lamp (RCL). From inside the bed 102, the tailgate actuator 122 is connected with the tailgate 118 through the hinge assembly 120.

The hinge assembly 120 and the tailgate actuator 122 serve as the basis for a power tailgate system. Through the hinge assembly 120, the tailgate actuator 122 is operable to pivotally close the tailgate 118, pivotally open the tailgate 118, and otherwise pivotally move the tailgate 118 between the open position and the closed position. Although the vehicle 100, as shown, includes one hinge assembly 120, and one tailgate actuator 122, it will be understood that this disclosure is applicable in principle to otherwise similar vehicles 100 including one or more hinge assemblies 120, and one or more tailgate actuators 122.

Figure 2:
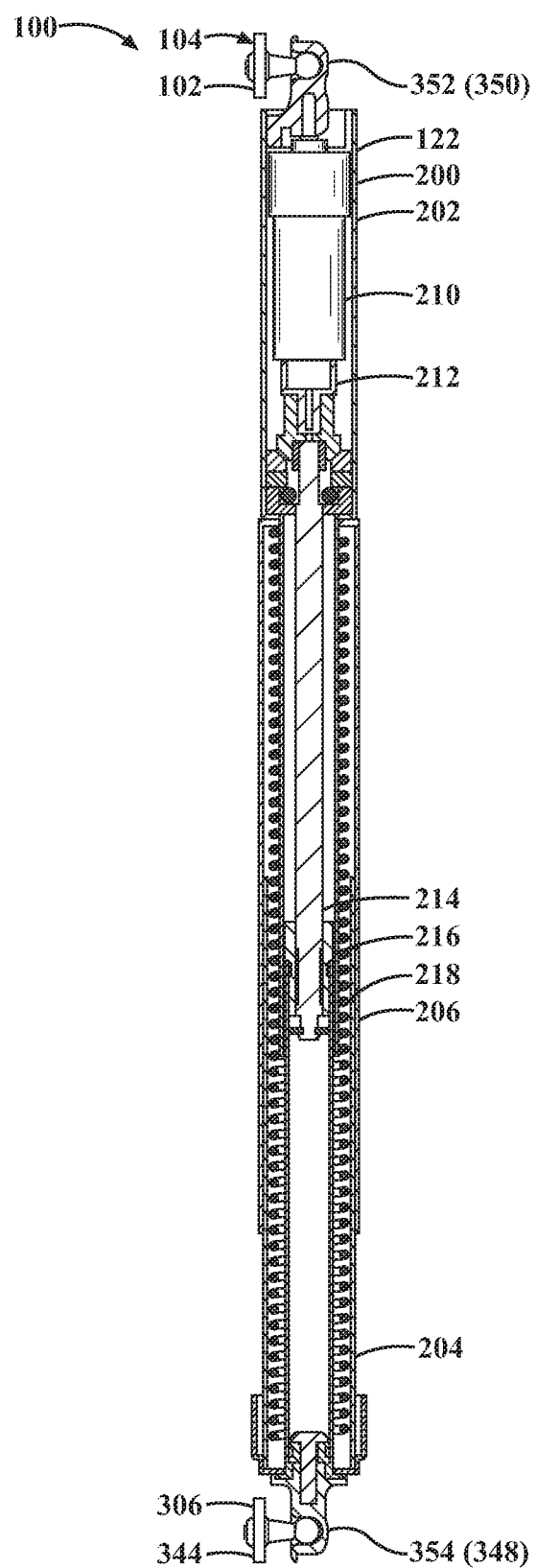
FIG. 2 portrays the vehicle using a cross-sectional view taken along the line 2-2 in FIG. 1B, showing aspects of the tailgate actuator.

As shown with additional reference to FIG. 2, the tailgate actuator 122 is a linear actuator. Likewise, the tailgate actuator 122 is operable to extend and retract. As shown, the tailgate actuator 122 is a motor-driven spindle drive. The tailgate actuator 122 includes a two-piece telescoping or otherwise extensible housing 200. The housing 200 includes a tubular base 202, a tubular slide 204, and a sliding overlap 206 therebetween. Inside the housing 200, the tailgate actuator 122 includes axially aligned items for converting rotary movement into linear extension and retraction. In particular, the tailgate actuator 122 includes a fixed motor 210, a fixed reduction drive 212, a rotary screw 214, and a fixed nut 216. The motor 210 and the reduction drive 212 are secured with the base 202, the nut 216 is secured with the slide 204, and the screw 214 runs through the nut 216. The base 202 and the nut 216 support the screw 214 for axial rotation, including powered axial rotation by the motor 210 through the reduction drive 212. In one implementation, the reduction drive 212 may be a planetary reduction drive. For instance, the reduction drive 212 may be a multistage planetary reduction drive. In one implementation, the screw 214 may be a ball screw, and the nut 216 may be a ball nut.

The motor 210 is operable to drive the tailgate actuator 122 to extend and retract. In particular, the motor 210 is operable to spin, and thereby power the axial rotation of the screw 214 through the reduction drive 212. As the screw 214 axially rotates, the nut 216 axially moves along the screw 214, and, as the nut 216 axially moves along the screw 214, the base 202 and the slide 204 are alternately drawn apart and drawn together. As the base 202 and the slide 204 are drawn apart, the tailgate actuator 122 is extended. Alternately, as the base 202 and the slide 204 are drawn together, the tailgate actuator 122 is retracted.

As set forth below, as the product of extending and retracting, the tailgate actuator 122 is operable to pivotally close the tailgate 118, pivotally open the tailgate 118, and otherwise pivotally move the tailgate 118 between the open position and the closed position. As the tailgate 118 is pivotally closed, the associated pivotal movement of the tailgate 118 is against gravity. Likewise, as the tailgate 118 is pivotally opened, the associated pivotal movement of the tailgate 118 is with gravity.

In one implementation, the tailgate actuator 122 is biased for extension. As the tailgate actuator 122 is operated to extend, and thereby pivotally close the tailgate 118, the bias for extension assists the associated pivotal movement of the tailgate 118 against gravity. Moreover, the tailgate actuator 122 is biased against retraction. As the tailgate actuator 122 is operated to retract, and thereby pivotally open the tailgate 118, the bias against retraction checks the associated pivotal movement of the tailgate 118 with gravity. Among other things, this implementation simplifies the construction of the vehicle 100. For instance, the tailgate actuator 122 serves in place of one or more struts, dampers and like items for either assisting the associated pivotal movement of the tailgate 118 against gravity as the tailgate 118 is pivotally closed, checking the associated pivotal movement of the tailgate 118 with gravity as the tailgate 118 is pivotally opened, or both.

As shown, to both bias the tailgate actuator 122 for extension, and bias the tailgate actuator 122 against retraction, the tailgate actuator 122 includes a spring 218 in the housing 200. From inside the housing 200, the spring 218 is engaged between the base 202 and the slide 204, and biases the base 202 and the slide 204 apart. When the tailgate actuator 122 is retracted, with the base 202 and the slide 204 having previously been drawn together, the spring 218 is compressed. As the tailgate actuator 122 is operated to extend, the spring 218 decompresses. As it decompresses, the spring 218 biases the base 202 and the slide 204 apart, and thereby biases the tailgate actuator 122 for extension. Contrariwise, when the tailgate actuator 122 is extended, with the base 202 and the slide 204 having previously been drawn apart, the spring 218 is decompressed. As the tailgate actuator 122 is operated to retract, the spring 218 compresses. As it compresses, the spring 218 biases the base 202 and the slide 204 apart, and thereby biases the tailgate actuator 122 against retraction.

As shown with additional reference to FIGS. 3A, 3B and 3C, as its core, the hinge assembly 120 includes a rotary through-bed torque shaft 300. The torque shaft 300 is axially aligned with the pivotal movement of the tailgate 118, and supported from the bed 102 for axial rotation. Along the axis of the torque shaft 300, the hinge assembly 120 includes a fixed bed-side support bracket 302. The support bracket 302 is secured to the bed 102, and supports the torque shaft 300 from the bed 102 for axial rotation. Moreover, the hinge assembly 120 includes a pivotal tailgate-side tailgate bracket 304, and a pivotal in-bed crank 306. The tailgate bracket 304 is secured to the tailgate 118. From outside the bed 102, the torque shaft 300 supports the tailgate bracket 304, and the tailgate 118 on the tailgate bracket 304, from the bed 102. From inside the bed 102, the tailgate actuator 122 is connected between the bed 102 and the crank 306. In association with the pivotal movement of the tailgate 118, the tailgate bracket 304, the torque shaft 300 and the crank 306 serially share rotary connections, or, in other words, connections that establish common rotation therebetween. Moreover, the bed 102, the tailgate actuator 122 and the crank 306 serially share pivotal connections. The torque shaft 300 transmits torque and rotation associated with the pivotal movement of the tailgate 118 between the tailgate bracket 304 and the crank 306, including from the crank 306 to the tailgate bracket 304.

With the bed 102, the tailgate actuator 122 and the crank 306 serially sharing pivotal connections, from between the bed 102 and the crank 306, as the product of extending and retracting, the tailgate actuator 122 is operable to pivot the crank 306 against the bed 102. With the tailgate bracket 304, the torque shaft 300 and the crank 306 serially sharing rotary connections, as the crank 306 pivots, the torque shaft 300 axially rotates, and, as the torque shaft 300 axially rotates, the tailgate bracket 304 pivots. With the tailgate bracket 304 secured to the tailgate 118, as the tailgate bracket 304 pivots, from on the tailgate bracket 304, the tailgate 118 pivotally closes, pivotally opens, and otherwise pivotally moves between the open position and the closed position.

The torque shaft 300 is configured to extend between the tailgate bracket 304 and the crank 306 through the bed 102. In a double-headed configuration, the torque shaft 300 includes a tailgate-side head 310 and a crank-side head 312. The tailgate-side head 310 and the crank-side head 312 are in spaced opposition about the intermediate remainder of the torque shaft 300. At the tailgate-side head 310, the torque shaft 300 is configured to make a rotary connection with the tailgate bracket 304. In particular, the tailgate-side head 310 is configured to make a head-to-socket connection with the tailgate bracket 304. At the crank-side head 312, the torque shaft 300 is configured to make a rotary connection with the crank 306. As part of the crank-side head 312, the torque shaft 300 includes an axially-oriented external profile 314 configured to make a shaft-to-hub connection with the crank 306. In one implementation, the external profile 314 extends from the tailgate-side head 310 through the crank-side head 312. Alternatively, the torque shaft 300 may include a cylindrical base that extends from the tailgate-side head 310 to the crank-side head 312. Moreover, the torque shaft 300 includes a retainer 316 configured to axially secure the crank 306 thereon.

The support bracket 302 includes a normally-oriented bed baseplate 320, and an axially-oriented tubular support 322 for the torque shaft 300. The support 322 projects from the bed baseplate 320 normally thereto. At its ends, the support 322 includes an opposing pair of flanged bushings 324 anchored therein for slidingly bearing the torque shaft 300 for axial rotation. The support bracket 302 axially receives the torque shaft 300 therethrough as a rotary item, including through the bed baseplate 320, and through the support 322. With the torque shaft 300 axially received therethrough, the support 322 supports the torque shaft 300 for axial rotation. The tailgate-side head 310 projects beyond the bed baseplate 320. Similarly, the crank-side head 312 projects beyond the support 322.

In the vehicle 100, the support bracket 302 is secured to the bed 102. As shown, the hinge assembly 120 includes one or more support bracket fasteners 326 for securing the support bracket 302 to the bed 102 by the bed baseplate 320. With configurations typical of rivets, screws, bolts and the like, the support bracket fasteners 326 include heads, and shanks projecting from the heads. From outside, the bed 102 receives the support 322 therethrough, and otherwise backs the bed baseplate 320. With the bed baseplate 320 backed against the bed 102 from outside, the support 322 extends through the bed 102, and projects inside the bed 102. Moreover, the support bracket fasteners 326 are installed from outside the bed 102. With their installation, the support bracket fasteners 326 engage the bed baseplate 320, extend through the bed baseplate 320 and the bed 102, and secure to the bed 102. Moreover, the support bracket fasteners 326 project inside the bed 102 alongside the support 322.

In the vehicle 100, with the support bracket 302 secured to the bed 102, the torque shaft 300 is supported from the bed 102 for axial rotation. From beyond the bed baseplate 320, the tailgate-side head 310 projects outside the bed 102 for making a rotary connection with the tailgate bracket 304. Together with the support 322, the torque shaft 300 extends through the bed 102. From beyond the support 322, the crank-side head 312 projects inside the bed 102 past the support bracket fasteners 326 for making a rotary connection with the crank 306.

The tailgate bracket 304 includes a normally-oriented tailgate baseplate 330, and an axially-oriented socket 332. The socket 332 projects from the tailgate baseplate 330 normally thereto. In a two-piece configuration, the socket 332 includes a structural surround 334, and an interior socket body 336. At the socket 332, the tailgate bracket 304 is configured to make a rotary connection with the torque shaft 300. In particular, the socket 332 is configured to make a socket-to-head connection with the torque shaft 300.

In the vehicle 100, the tailgate bracket 304 is secured to the tailgate 118. As shown, the hinge assembly 120 includes one or more tailgate bracket fasteners 338 for securing the tailgate bracket 304 to the tailgate 118 by the tailgate baseplate 330. With configurations typical of rivets, screws, bolts and the like, the tailgate bracket fasteners 338 include heads, and shanks projecting from the heads. From outside, the tailgate 118 backs the tailgate baseplate 330. With the tailgate baseplate 330 backed against the tailgate 118 from outside, the tailgate bracket fasteners 338 are installed from outside the tailgate 118. With their installation, the tailgate bracket fasteners 338 engage the tailgate baseplate 330, extend through the tailgate baseplate 330 and the tailgate 118, and secure to the tailgate 118. With the tailgate bracket 304 secured to the tailgate 118, the socket 332 projects outside the tailgate 118 for making a rotary connection with the torque shaft 300.

As noted above, the torque shaft 300, at the tailgate-side head 310, and the tailgate bracket 304, at the socket 332, are configured to make a rotary connection with one another. In particular, the tailgate-side head 310 and the socket 332 are configured to make a head-and-socket connection with one another. In the vehicle 100, the head-and-socket connection serves to connect the tailgate 118 to the bed 102. At the head-and-socket connection, the torque shaft 300 supports the tailgate bracket 304, and the tailgate 118 on the tailgate bracket 304, from the bed 102. Moreover, the torque shaft 300 transmits torque and rotation associated with the pivotal movement of the tailgate 118 to the tailgate bracket 304. The tailgate-side head 310 and the socket 332 may include any combination of complementary axially-oriented external and internal features for making the head-and-socket connection. For instance, as shown, the tailgate-side head 310 is obround, and includes external side flats, and an external top arch. Likewise, the socket 332 is inverted U-shaped, and includes internal side flats, and an internal top arch.

In one implementation, to render the tailgate 118 manually removable from the bed 102, the socket 332 is open-bottomed. With its open-bottomed configuration, the socket 332 is configured to receive and release the tailgate-side head 310 through the bottom to make and unmake the head-and-socket connection. With the head-and-socket connection made, to initiate is manual removal therefrom, the tailgate 118 is manually lifted from the bed 102. As the tailgate 118 is manually lifted from the bed 102, the tailgate bracket 304 is lifted with the tailgate 118, and the socket 332 releases the tailgate-side head 310 through the bottom to unmake the head-and-socket connection.

In one implementation, the torque shaft 300, including the tailgate-side head 310, is made from a metallic material. Similarly, in the socket 332, the surround 334 is made from a metallic material. However, to dampen vibration at the head-and-socket connection, and reduce associated noise, wear and the like, the socket body 336 is made from a high-strength polymeric material, such as resin.

The crank 306 is housed in the bed 102. As shown, the crank 306 is housed in the same compartment as the tailgate actuator 122. From inside the bed 102, the crank 306 is configured to extend between the torque shaft 300 and the tailgate actuator 122. The crank 306 is plate-like, and, from end to end, includes successively extending plate-like regions. The regions include a shaft-side base 340, a load arm 342, and an actuator-side base 344. The shaft-side base 340 and the actuator-side base 344 are in spaced opposition about the load arm 342. Likewise, the load arm 342 extends between the shaft-side base 340 and the actuator-side base 344. At the shaft-side base 340, the crank 306 is configured to make a rotary connection with the torque shaft 300. In particular, as part of the shaft-side base 340, the crank 306 includes an axially-oriented internal profile 346 configured to make a hub-to-shaft connection with the torque shaft 300. At the actuator-side base 344, the crank 306 is configured to make a pivotal connection with the tailgate actuator 122. In particular, as part of the actuator-side base 344, the crank 306 includes an axially-oriented ball stud 348 configured to make a ball-to-socket connection with the tailgate actuator 122. The ball stud 348 projects from the actuator-side base 344 normally thereto.

Housing not only the tailgate actuator 122, but also the crank 306, in the bed 102 improves reliability. With the crank 306 housed in the bed 102, the torque shaft 300, which axially rotates in association with the pivotal movement of the tailgate 118, extends through the bed 102 together with the support 322. For instance, compared with the crank 306, which pivots in association with the pivotal movement of the tailgate 118, extending through the bed 102, the clearance through the bed 102 is minimized. With the clearance through the bed 102 minimized, the threat of water, dirt, debris and the like entering the bed 102 from outside is minimized.

As noted above, the torque shaft 300, at the crank-side head 312, and the crank 306, at the shaft-side base 340, are configured to make a rotary connection with one another. In particular, the torque shaft 300 and the crank 306 are configured to make a shaft-and-hub connection with one another. In the vehicle 100, at the shaft-and-hub connection, the torque shaft 300 transmits torque and rotation associated with the pivotal movement of the tailgate 118 from the crank 306. The crank-side head 312 and the shaft-side base 340 may include any combination of complementary external and internal features for making the shaft-and-hub connection. For instance, as noted above, as part of the crank-side head 312, the torque shaft 300 includes the external profile 314, and, as part of the shaft-side base 340, the crank 306 includes the internal profile 346. In one implementation, the external profile 314 is an external lobed polygonal profile, and the internal profile 346 is an internal lobed polygonal profile. In particular, as shown with additional reference to FIG. 3D, the external profile 314 is an external four-lobe polygonal profile, and the internal profile 346 is an internal four-lobe polygonal profile. The external profile 314 and the internal profile 346 may, for instance, comply with German DIN standard 32712 for P4C four-lobe polygonal profiles. Alternatively, the external profile 314 may be an external three-lobe polygonal profile, and the internal profile 346 may be an internal three-lobe polygonal profile. The external profile 314 and the internal profile 346 may, for instance, comply with German DIN standard 32711 for P3G three-lobe polygonal profiles. In one implementation, the external profile 314 is an external lobed polygonal profile that extends from the tailgate-side head 310 through the crank-side head 312, and the support 322 supports the torque shaft 300 for axial rotation by the corners of the external lobed polygonal profile.

In one implementation, the torque shaft 300, including the crank-side head 312, is made from a metallic material. Similarly, the crank 306 is made from a metallic material. In this implementation, the external lobed polygonal profile and the internal lobed polygonal profile improve any combination of quality, cost, manufacturability and the like. For instance, compared to external splines and internal splines for making shaft-and-hub connections, the external lobed polygonal profile and the internal lobed polygonal profile feature simplified geometry, improved toque capacity, and improved resistance to fretting. Accordingly, either the torque shaft 300 or the crank 306, or both, may be made from lower strength metallic material. Moreover, the external lobed polygonal profile may be straightforwardly formed into the crank-side head 312. In one implementation, the external lobed polygonal profile may be cold drawn from the tailgate-side head 310 through the crank-side head 312, as opposed to being machined or rolled into the crank-side head 312. Alternatively, with the torque shaft 300 starting as a cylindrical base from the tailgate-side head 310 through the crank-side head 312, the external lobed polygonal profile may be die-forged into the crank-side head 312, as opposed to being machined or rolled into the crank-side head 312. Likewise, the internal lobed polygonal profile may be punched into the shaft-side base 340, as opposed to being machined or broached into the shaft-side base 340. Moreover, with the torque shaft 300 being made from lower strength metallic material, after making the shaft-and-hub connection, the retainer 316 may be straightforwardly formed into the crank-side head 312, as opposed to being rendered by the combination of a spring clip and a spring clip seat machined into the crank-side head 312. For instance, the retainer 316 may be formed into the crank-side head 312 by orbital riveting.

From inside the bed 102, the tailgate actuator 122 is configured to reach between the bed 102 and the crank 306. As noted above, as the product of extending and retracting, the tailgate actuator 122 is operable to pivot the crank 306 against the bed 102. Likewise, to allow the tailgate actuator 122 to extend and retract in association with pivoting the crank 306 against the bed 102, the bed 102, the tailgate actuator 122 and the crank 306 serially share pivotal connections. Accordingly, the bed 102, and the tailgate actuator 122, at the base 202, are configured to make a pivotal connection with one another. In particular, inside, the bed 102 includes a bracket-mounted ball stud 350, as part of the base 202, the tailgate actuator 122 includes a ball socket 352, and the ball stud 350 and the ball socket 352 are configured to make a ball-and-socket connection with one another. Moreover, the crank 306, at the actuator-side base 344, and the tailgate actuator 122, at the slide 204, are configured to make a pivotal connection with one another. In particular, as part of the actuator-side base 344, the crank 306 includes the ball stud 348, as part of the slide 204, the tailgate actuator 122 includes a ball socket 354, and the ball stud 348 and the ball socket 354 are configured to make a ball-and-socket connection with one another.

The crank 306 includes a dogleg along the shaft-side base 340, the load arm 342 and the actuator-side base 344. As shown, following the dogleg, the shaft-side base 340 and the actuator-side base 344 are parallel or otherwise commonly oriented with one another, and the load arm 342 extends obliquely between the shaft-side base 340 and the actuator-side base 344. Moreover, the crank 306 includes an embossed rib 356. As shown, the embossed rib 356 extends along the load arm 342. In particular, the embossed rib 356 extends along the shaft-side base 340, the load arm 342 and the actuator-side base 344 between the internal profile 346 and the ball stud 348.

The dogleg and the embossed rib 356 improve any combination of design soundness, reliability and the like. For instance, as the tailgate actuator 122 pivots the crank 306 against the bed 102, the load arm 342 will experience increasingly reduced torsional forces with increasing radial alignment between the shaft-and-hub connection and the ball-and-socket connection. As noted above, for making the shaft-and-hub connection, as part of the crank-side head 312, the torque shaft 300 includes the external profile 314, and, as part of the shaft-side base 340, the crank 306 includes the internal profile 346. Moreover, for making the ball-and-socket connection, as part of the actuator-side base 344, the crank 306 includes the ball stud 348, and, as part of the slide 204, the tailgate actuator 122 includes the ball socket 354. With respect to the crank 306, with the internal profile 346 extending through the shaft-side base 340, and the ball stud 348 projecting from the actuator-side base 344, the dogleg increases the radial alignment between the internal profile 346 and the ball stud 348. Likewise, the dogleg increases the radial alignment between the shaft-and-hub connection and the ball-and-socket connection. As a complement to the associated reduced torsional forces experienced by the load arm 342 as the tailgate actuator 122 pivots the crank 306 against the bed 102, the embossed rib 356 improves torsional resistance without an accompanying mass penalty.

Moreover, the dogleg improves packaging. As noted above, in the vehicle 100, the crank 306 pivots in association with the pivotal movement of the tailgate 118. With the crank 306 housed in the bed 102, the crank 306 pivots inside the bed 102. As it pivots inside the bed 102, the crank 306 occupies a swept volume about the shaft-and-hub connection. With the support bracket fasteners 326 projecting inside the bed 102 alongside the support 322, to accommodate the pivotation of the crank 306 inside the bed 102, the shaft-and-hub connection is made inside the bed 102 past the support bracket fasteners 326. With the ball stud 348 projecting from the actuator-side base 344, the dogleg facilitates against making the ball-and-socket connection even further inside the bed 102 past the support bracket fasteners 326. Accordingly, the dogleg reduces the space required to house the tailgate actuator 122 and the crank 306 in the bed 102.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
   a bed;
   a tailgate;
   a tailgate bracket secured to the tailgate, the tailgate bracket including a socket projecting outside the tailgate;
   a support bracket secured to the bed, the support bracket including a support extending through the bed;
   a torque shaft extending through the bed together with the support, and supported thereby for axial rotation, the torque shaft including a tailgate-side head projecting outside the bed, and a crank-side head projecting inside the bed, the tailgate-side head and the socket configured to make a head-and-socket connection with one another, and the crank-side head including an external profile;
   a crank housed in the bed, the crank including a shaft-side base and an actuator-side base, a load arm extending therebetween, and a dogleg along the shaft-side base, the load arm and the actuator-side base, the load arm following the dogleg to extend from the shaft-side base to the actuator-side base toward the tailgate, the shaft-side base including an internal profile, the external profile and the internal profile configured to make a shaft-and-hub connection with one another, and the actuator-side base including a ball stud projecting therefrom, with the dogleg increasing radial alignment between the internal profile and the ball stud; and
   a tailgate actuator housed in the bed and operable to pivot the crank against the bed to pivotally move the tailgate, the tailgate actuator including a ball socket, the ball stud and the ball socket configured to make a ball-and-socket connection with one another.

2. The vehicle of claim 1, wherein the socket includes a structural surround made from a metallic material, and an interior socket body made from a high-strength polymeric material.

3. The vehicle of claim 1, wherein the socket is open-bottomed, and configured to receive and release the tailgate-side head through the bottom to make and unmake the head-and-socket connection.

4. The vehicle of claim 1, wherein the crank includes the an embossed rib extending along the load arm.

5. The vehicle of claim 1, wherein the external profile is an external lobed polygonal profile, and the internal profile is an internal lobed polygonal profile.

6. The vehicle of claim 5, wherein the external lobed polygonal profile is an external four-lobe polygonal profile, and the internal lobed polygonal profile is an internal four-lobe polygonal profile.

7. The vehicle of claim 5, wherein the external lobed polygonal profile extends from the tailgate-side head through the crank-side head, and the support supports the torque shaft for axial rotation by the corners of the external lobed polygonal profile.

8. The vehicle of claim 1, wherein the crank-side head includes a retainer axially securing the crank thereon, the retainer formed into the crank-side head.

9. The vehicle of claim 1, wherein the tailgate actuator is operable extend and retract to pivot the crank against the bed to pivotally close the tailgate and pivotally open the tailgate, the tailgate actuator including an extensible housing, and biased against retraction from inside the housing, whereby as the tailgate actuator is operated to retract, and thereby pivotally open the tailgate, the bias against retraction checks the associated pivotal movement of the tailgate with gravity.

10. The vehicle of claim 9, wherein the vehicle does not include an item besides the tailgate actuator for checking the associated pivotal movement of the tailgate with gravity.

11. A hinge assembly, comprising:
a tailgate bracket securable to a vehicular tailgate, the tailgate bracket including a socket;
a support bracket securable to a vehicular bed, the support bracket including a support;
a torque shaft supportable by the support for axial rotation, the torque shaft including a tailgate-side head and a crank-side head, the tailgate-side head and the socket configured to make a head-and-socket connection with one another, and the crank-side head including an external profile; and
a crank, the crank including a shaft-side base and an actuator-side base, a load arm extending therebetween, and a dogleg along the shaft-side base, the load arm and the actuator-side base, the load arm following the dogleg to extend from the shaft-side base to the actuator-side base toward the tailgate, the shaft-side base including an internal profile, the external profile and the internal profile configured to make a shaft-and-hub connection with one another.

12. The hinge assembly of claim 11, wherein the socket includes a structural surround made from a metallic material, and an interior socket body made from a high-strength polymeric material.

13. The hinge assembly of claim 11, wherein the socket is open-bottomed, and configured to receive and release the tailgate-side head through the bottom to make and unmake the head-and-socket connection.

14. The hinge assembly of claim 11, wherein the actuator-side base includes a ball stud projecting therefrom, with the dogleg increasing radial alignment between the internal profile and the ball stud.

15. The hinge assembly of claim 11, wherein the crank includes an embossed rib extending along the load arm.

16. The hinge assembly of claim 11, wherein the external profile is an external lobed polygonal profile, and the internal profile is an internal lobed polygonal profile.

17. The hinge assembly of claim 16, wherein the external lobed polygonal profile is an external four-lobe polygonal profile, and the internal lobed polygonal profile is an internal four-lobe polygonal profile.

18. The hinge assembly of claim 16, wherein the external lobed polygonal profile extends from the tailgate-side head through the crank-side head, and the torque shaft is supportable by the support for axial rotation by the corners of the external lobed polygonal profile.

19. A hinge assembly, comprising:
a tailgate bracket securable to a vehicular tailgate, the tailgate bracket including an open-bottomed socket;
a support bracket securable to a vehicular bed, the support bracket including a support;
a torque shaft supportable by the support for axial rotation, the torque shaft including a tailgate-side head and a crank-side head, the tailgate-side head and the socket configured to make a head-and-socket connection with one another, with the socket configured to receive and release the tailgate-side head through the bottom to make and unmake the head-and-socket connection, and the crank-side head including an external lobed polygonal profile; and
a crank, the crank including a shaft-side base and an actuator-side base, a load arm extending therebetween, and a dogleg along the shaft-side base, the load arm and the actuator-side base, the load arm following the dogleg to extend from the shaft-side base to the actuator-side base toward the tailgate, the shaft-side base including an internal lobed polygonal profile, the external lobed polygonal profile and the internal lobed polygonal profile configured to make a shaft-and-hub connection with one another, and the actuator-side base including a ball stud projecting therefrom.

20. The hinge assembly of claim 19, wherein the external lobed polygonal profile is an external four-lobe polygonal profile, and the internal lobed polygonal profile is an internal four-lobe polygonal profile.

* * * * *